C. F. FAYER.
ALTERNATING CURRENT RECTIFIER.
APPLICATION FILED MAR. 22, 1912.
1,048,819.
Patented Dec. 31, 1912.
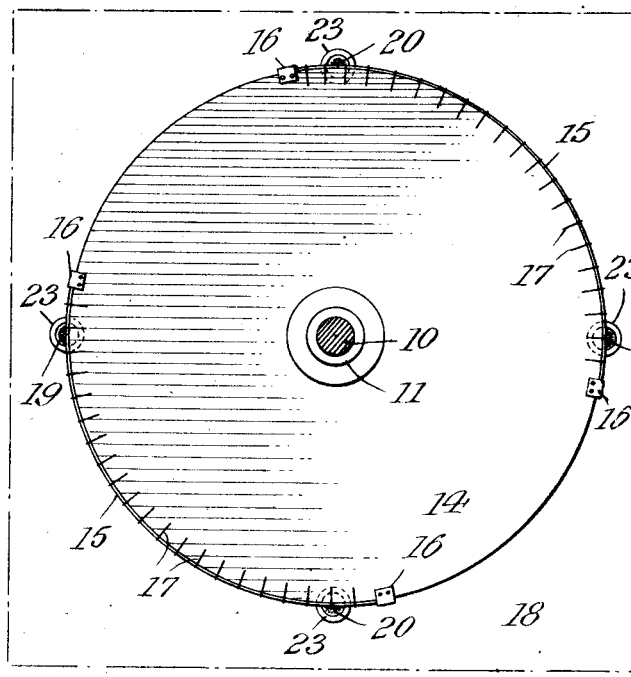
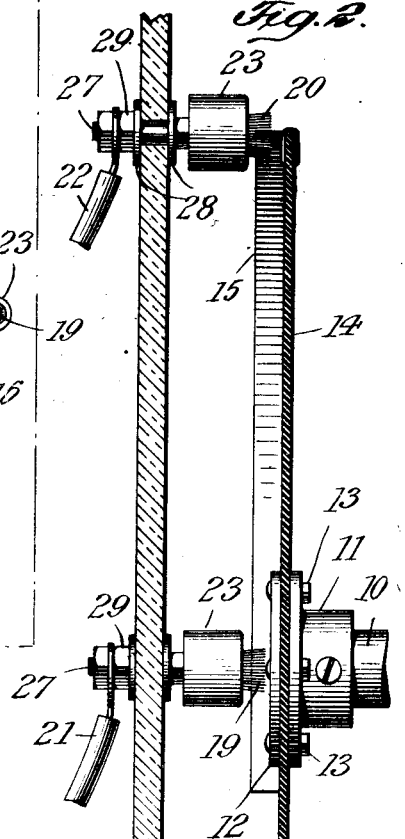
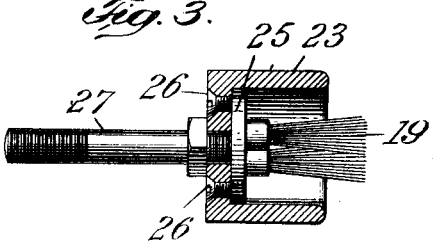
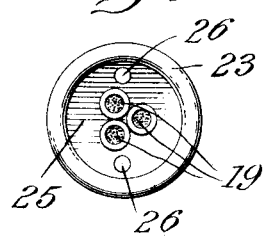
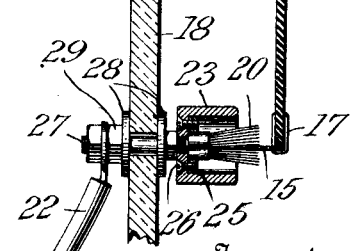
Witnesses:
Inventor
Charles F. Fayer
By his Attorneys

UNITED STATES PATENT OFFICE.

CHARLES F. FAYER, OF NEW YORK, N. Y., ASSIGNOR TO WAPPLER ELECTRIC MANUFACTURING COMPANY, OF NEW YORK, N. Y.

ALTERNATING-CURRENT RECTIFIER.

1,048,819. Specification of Letters Patent. Patented Dec. 31, 1912.

Application filed March 22, 1912. Serial No. 685,477.

*To all whom it may concern:*

Be it known that I, CHARLES F. FAYER, a citizen of the United States, residing at New York city, county and State of New York, have invented a new and Improved Alternating-Current Rectifier, of which the following is a specification.

This invention relates to a novel device for rectifying alternating current of high tension, the invention being more particularly designed for obtaining a pulsating unidirectional current for therapeutic and similar devices.

In the accompanying drawing: Figure 1 a face view partly in section of a rectifier embodying my invention; Fig. 2 an enlarged vertical cross section thereof; Fig. 3 a detail of one of the brushes, and Fig. 4 an end view of Fig. 3.

The shaft 10 of the rectifier is rotated by an alternating current electromotor (not shown) and carries a flanged collar 11 to which is firmly secured by plate 12 and bolts 13, a disk 14 made of insulating material. To the rim of the disk are attached a pair of diametrically opposed conductive segments 15 constituting the movable contacts of the device. As shown, each segment is made in the form of a curved metal strip provided with end clips 16 that straddle disk 14 and are firmly secured thereto. Intermediate clips 16, wires 17 hold the segment to the disk against axial displacement. Back of disk 14, there is arranged a stationary insulating plate 18 supported in suitable manner in parallelism with disk 14. Within the paths of segments 15 are fitted to plate 18 a plurality of diametrically opposed metal brushes which are placed at even distances from each other, the drawing showing two pairs 19, 20 of said brushes. The correlation of the parts is such that the length of each segment 15 exceeds the distance between any two adjoining brushes 19, 20, so that with the four brushes shown, each segment must be longer than a quarter circle struck with a like radius. The brushes 19 receive high tensioned alternating current through wires 21 from a suitable source, the condition being that the electromotor above referred to rotates synchronously with the oscillation of the alternating current supplied to contacts 19 as fully described in Patent Number 992,302 issued to R. H. Wappler May 16th, 1911. During operation, each segment 15 will alternately connect each of the receiving brushes 19 with one or the other of the delivery brushes 20 so as to obtain the desired rectification of the current. Brushes 20 are by wires 22 connected to the therapeutic or other device (not shown) which is adapted to be operated by the pulsating unidirectional current thus obtained. In order to reduce sparking, each brush is centered within a metal cup or spark diverting member 23, to which it is conductively connected. The brush protrudes from the open end of the cup, so as to make a bodily or frictional contact with segments 15. The diameter of each cup 23 is such that a substantial clearance is formed within the cup around the brush as illustrated in Fig. 3. The cups should furthermore be so mounted that their rims are arranged in close proximity to the paths of the segments (Fig. 2) so that the sparks may be freely caught up thereby immediately after a contact has been broken between brush and segment. In other words the bulk of the opening sparks generated upon the breakage of contact between a brush and segment will be diverted from the brush to the cup for the reason that the rear segment edge will recede from a cup-rim subsequent to its parting from the brush. Thus the majority of the sparks will select the shorter path and will flow to the cup, so as to correspondingly relieve the brush in the manner desired.

The brushes and cup may be constructed and combined in suitable manner. Thus the drawing shows each brush to be composed of a plurality of tufts in sockets 24 of a plate 25, which is fitted into cup 23 and secured to the bottom thereof by screws 26. The cup is connected to plate 18 by means of bolt 27 tapped into the cup and passing through an aperture of plate 18, to which it is attached by washers 28 and nut 29, the bolt likewise constituting a binding post for the corresponding conducting wire.

I claim:

1. An alternating current rectifier comprising a pair of diametrically opposed rotary segments, fixed diametrically opposed brushes adapted to be engaged by said segments, and spark diverting members arranged in proximity to the brushes and set back from the ends thereof.

2. An alternating current rectifier comprising a pair of diametrically opposed rotary segments, fixed diametrically opposed brushes adapted to be engaged by said segments, and spark diverting cup-shaped members surrounding the brushes, and set back from the ends thereof.

3. An alternating current rectifier comprising a pair of diametrically opposed rotary segments, fixed diametrically opposed brushes adapted to be engaged by said segments, spark diverting cup-shaped members surrounding the brushes and set back from the ends thereof, the rims of said members being arranged in proximity to the paths of the segments.

CHARLES F. FAYER.

Witnesses:
ARTHUR E. ZUMPE,
KATHERYNE KOCH.